United States Patent [19]

Inoue

[11] Patent Number: 4,596,066

[45] Date of Patent: Jun. 24, 1986

[54] MACHINING CENTER

[75] Inventor: Kiyoshi Inoue, Tokyo, Japan

[73] Assignee: Inoue-Japax Research Incorporated, Kanagawaken, Japan

[21] Appl. No.: 589,875

[22] Filed: Mar. 15, 1984

[30] Foreign Application Priority Data

Mar. 16, 1983 [JP] Japan .................................. 58-42236

[51] Int. Cl.[4] .......................... B23Q 3/157; B23P 1/12
[52] U.S. Cl. ..................................... 29/568; 51/165.87; 219/69 E; 219/69 M; 409/63
[58] Field of Search ................... 29/568, 26 A; 409/63, 409/80, 187, 148, 132; 51/165.88, 165.87, 5; 364/474; 219/69 E, 69 V, 69 M

[56] References Cited

U.S. PATENT DOCUMENTS

| | | | |
|---|---|---|---|
| 3,627,490 | 12/1971 | Asano | 51/165.87 |
| 3,714,741 | 2/1973 | Uhtenwoldt | 51/165.87 |
| 3,739,528 | 6/1973 | Robillard | 51/165.87 X |
| 3,828,477 | 8/1974 | Sanford et al. | 51/5 |
| 4,071,729 | 1/1978 | Bell | 219/69 C |
| 4,122,635 | 10/1978 | Asano et al. | 51/165.87 X |
| 4,307,279 | 12/1981 | Inoue et al. | 219/69 M |
| 4,316,071 | 2/1982 | Bonga | 219/69 E |

FOREIGN PATENT DOCUMENTS

| | | | |
|---|---|---|---|
| 74518 | 3/1983 | European Pat. Off. | 51/165.87 |
| 2708812 | 9/1977 | Fed. Rep. of Germany | 51/165.87 |
| 1580086 | 11/1980 | United Kingdom | 29/568 |

OTHER PUBLICATIONS

"Tooling for Multiple Lead Applications of EDM", by E. Y. Seborg, Society of the Automotive Engineers, Document No. 680636.
Machinery and Production Engineering: 17 Oct. 1973, pp. 536–538, "Ex-Cell-O 6-Station ED Machine".

*Primary Examiner*—William R. Briggs
*Attorney, Agent, or Firm*—Karl F. Ross; Herbert Dubno

[57] ABSTRACT

A machining center or system for shaping workpieces, having a numerical controller (NC) for transmitting control commands in accordance with input data. A principal tool has a tool holder and a numerically controlled machining feed unit for shaping a workpiece under the numerical commands. A tool storage station accepts a plurality of formed machining tools and a tool changing mechanism interconnects the tool storage station and the principal machine tool. The center incorporates a tool reforming station which responds to a set of numerical commands from the NC unit to act on a formed machining tool when on one of the tool storage station, the tool changing mechanism and the tool holder in the principal machine tool. The tool reforming station includes at least one subsidiary machine tool with a machining feed unit operative under another set of numerical commands from the NC unit to reform the formed machining tool by commanded dimensions for transfer or re-transfer into the shaping zone in the principal machine tool.

10 Claims, 2 Drawing Figures

MACHINING CENTER

FIELD OF THE INVENTION

The present invention relates generally to machining centers and, more particularly, to a new and improved machining center or system for automatically shaping one or more work-pieces by means of one or a plurality of similar or different formed machining tools under commands of a numerical controller.

BACKGROUND OF THE INVENTION

A machining center, which commonly comprises a machine tool, a tool storage station and a tool exchanging mechanism, is known to be highly efficient and versatile and useful for shaping a workpiece with an intricate contour by utilizing a plurality of formed machining tools which are simpler but different in shape, or which are similar to each other but different in size. These tools are preformed and introduced into the system by a magazine in the tool storage station. The tool exchanging mechanism is operated under numerical control to select the stored tools in a programmed order and to transfer each selected tool to and secure the tool in a tool holder in the machine tool. The machine tool, which may be an electroerosion machine, is also typically operated under full numerical commands to machine a workpiece into a predetermined surface and precision grade or partial shaping pattern pre-alotted therein. The tool exchanging mechanism then unloads the selected working tool from the machine tool and returns it to the storage station for exchange with a new selected working tool to transfer the latter to the machine tool for a subsequent machining operation. It is also possible to use a different tool stored in the magazine for a different workpiece loaded in the machine tool.

In certain types of machine tools such as electroerosion machine, it is known that a formed machining tool wears quickly. Thus, for a given shaping purpose it may be vital that a number of tools (electrodes) of precisely identical form and size be prepared. Also, for the sake of machining efficiency there may arise a need for successive machining grades of tools which are similar but of slightly different sizes. These tools or electrodes must each be preformed with precision but once used become inaccurate due to wear. In the existing machining centers, therefore, the worn tools have been nothing other than scraps or the equivalent which can after return to the storage magazine be simply discarded or removed as being no longer useful therein.

It should also be pointed out that a numerically controlled machine tool, e.g. electroerosion machine, has the ability to position each machining tool therein for and during a given machining operation and the ability to achieve a machined shape unparalleled and yet accurately predictable precision. The ability to precision-position the working tool in the numerical control system is, however, limited to the positioning of a tool center or reference point in its coordinate system. If there is any inaccuracy in the position of each point of the preformed machining tool which is introduced into and maintained in the system, the machining accuracy is far less than the genuine precision thereof. In the existing machining centers, it has been found that such an inaccuracy is at least one order greater than the true inaccuracy of a given NC system for use on the commercial scale.

OBJECTS OF THE INVENTION

Accordingly, the present invention seeks to provide a new and improved machine center or numerically controlled machining system which can drastically reduce the number of machining tools needed to be stored in the tool storage station, allows repeated use of a machining tool worn in the system, can eliminate the need for the precision-preforming of machining tools to be introduced into the system, and is yet capable of achieving true accuracy in shaping a workpiece on a fully automatic basis.

SUMMARY OF THE INVENTION

In accordance with the present invention there is provided a machining system which comprises: a numerical control unit; a principal machine tool having tool holding means for securely supporting a member in machining relationship with a workpiece in a shaping zone and machining feed means operable under a first set of numerical commands from the control unit to shape the workpiece into shape and dimensions determined by commands of the NC unit in the shaping zone by means of the machining member; a tool storage station for accepting a plurality of formed machining tools in a magazine thereof to retentively hold them on respective retainer means therein; tool transfer means arranged to interconnect the tool storage station and the machine tool and having transfer drive means operable under a second set of numerical commands from the control unit to accept a selected one of the formed machining tools from the magazine and to transfer and secure it to the tool holding means for shaping the workpiece with it as the machining member in the machine tool and for thereafter returning it to the magazine in the tool storage station; and tool reforming means controlled by a third set of numerical commands from the control unit to act on a said selected machining tool when on one of the said retainer means, transfer means and holding means, the tool forming means including at least one subsidiary machine tool operable under a fourth set of numerical commands from the control unit for transfer or re-transfer into the said shaping zone in the principal machine tool.

The invention also provides in another aspect thereof a machining system for shaping a workpiece, which system comprises: a digital control circuit; a principal machine tool having tool holding means for securely supporting a member in machining relationship with a workpiece in a shaping zone and machining feed means operable under a first set of digital commands from the control circuit to shape the workpiece into commanded shape and dimensions by means of the machining member; a tool reception stage for accepting in retainer means therein at least one machining tool preformed outside of the system; tool transfer means arranged to interconnect the tool reception stage and the machine tool and operable under a second set of digital commands from the control circuit to transfer the preformed machining tool from the tool reception stage and to secure it to the tool holding means for shaping the workpiece with it as the machining member in the machine tool; and a tool reforming stage operable to actuate under a third set of digital commands from the control circuit to act on the machining tool when on one of the said retainer means, the said transfer means and the said holding means, the tool reforming stage including at least one subsidiary machine tool operable under a fourth set of digital commands from the control circuit to reform the preformed machining tool by commanded dimensions for transfer or retransfer into the said shaping zone in the principal machining tool.

The invention also provides in yet another aspect thereof a machining system for shaping a workpiece, which system comprises: a numerical control unit for transmitting control commands in accordance with input data received therein; a principal machine tool having tool holding means for accepting at least one formed machining tool and securely supporting it in machining relationship with the workpiece in a shaping zone and machining feed means operable under a first set of control commands from the unit to partially shape the workpiece into commanded shape and dimensions by means of the formed machining tool; and tool reforming means comprising tool handling means operative under a second set of control commands from the unit to remove the machining tool out of the shaping zone of the machine tool and at least one subsidiary machine tool operative under a third set of control commands form the unit to reform the machining tool by commanded dimensions, the tool handling means being operative under a fourth set of control commands to return the reformed machining tool into the shaping zone, the machining feed means of the principal machine tool being then operative under a fifth set of control commands form the unit to continue shaping of the partially shaped workpiece and to shape it into commanded shape and dimensions.

BRIEF DESCRIPTION OF THE DRAWING

These and other features of the present invention as well as advantages thereof will become more readily apparent from a reading of the following description when taken with reference to the accompanying drawing in which.

SPECIFIC DESCRIPTION

Figure 1:
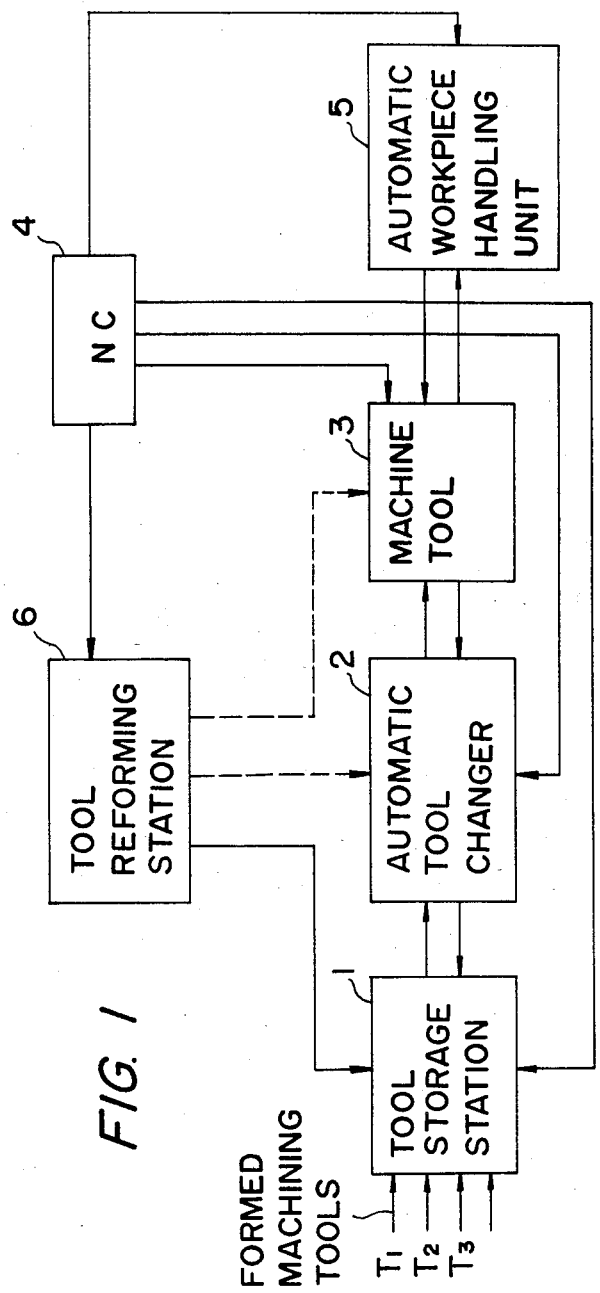
FIG. 1 is a block diagram illustrating a machining center embodying the present invention and showing in general where tool reforming may be performed in the system.

Referring now to FIG. 1, the machining center shown includes a tool storage station (TSS) 1, a tool changing mechanism 2, commonly called ATC (automatic tool changer), and a machine tool (MT) 3, each of which may be of any well known conventional design and which may be organized together in the conventional manner to operate under control of a digital circuit or numerical control (NC) unit 4. The tool storage station 1 is adapted to accept a plurality of machining tools T1, T2, T3, ... which are preformed outside of the system and supplied. These tools, generally referred to as T, are stored in their respective retainers in a magazine of the tool storage station 1. The tool changing mechanism 2 operates under numerical or control commands from the NC unit 4 to select the stored tools T in a predetermined order programmed therein, and to transfer each selected tool T to the machine tool 3. The machine tool 3 has a tool holder to accept the transferred machining tool T and to support it in machining relationship with a workpiece loaded therein. The machine tool 3 has machining feed means operated under control commands of the NC unit 4 to shape the workpiece. The used machining tool T is then released from the tool holder and returned by means of the tool changer 2 under control commands of the NC unit 4 to the tool storage station 1. The tool changer 2 then picks up a next selected one of the formed machining tools T in the tool station 1 to transfer it to the machine tool 3 under control commands from the NC unit 4. The machining feed means in the machine tool 3 then operates under control commands of the NC unit 4 to continue shaping of the workpiece with the renewed machining tool T. The machine tool 3 may also be provided with an automatic workpiece handling unit 5 which operates under commands of the NC unit 4 to successively load workpieces to be shaped in the machining tools T and unload the shaped workpieces. The NC unit 4 may itself be of conventional design to produce therein necessary control commands following corresponding data inputted therein in a customary manner.

In accordance with the present invention a tool reforming stage 6 is provided to operate under control commands of the NC unit 4 to act on a machining tool T prior to and/or subsequent to a given shaping operation in the machine tool 3. Thus, the tool reforming means 6 may act on a pre-machining tool T, viz. a fresh machining tool which is in the tool storage station 1, on the tool changing mechanism 2 or on the tool holder in the machine tool 3 for transfer to the shaping zone in the machine tool 3. The tool reforming means 6 may also act on a post-machining tool T, viz. a used machining tool which is removed from the shaping zone in the machine tool 3 and is in the tool storage station 1, on the tool changing mechanism 2 or on the tool holder in the machine tool 3 for re-transfer to the shaping zone in the machine tool 3 for a subsequent programmed shaping operation.

Figure 2:
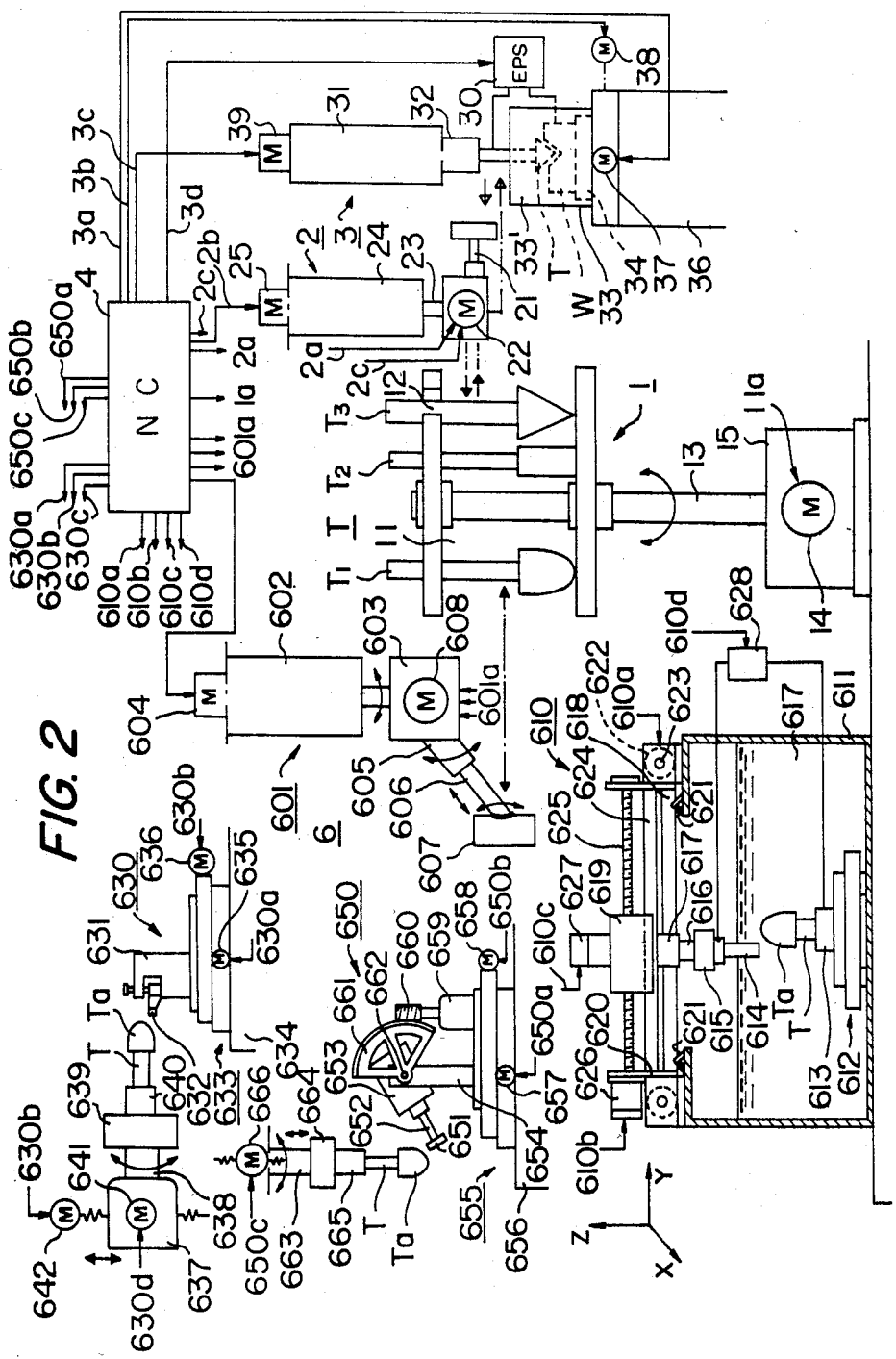
FIG. 2 is a schematic view diagrammatically illustrating a machining center or system according to an embodiment of the invention, including a principal machine tool, subsidiary machine tools for reforming formed tools, and a tool handling means in association with a tool storage station and a tool exchanger, all operated under control commands of a numerical controller.

The machine tool 3 may be any shaping machine commonly employed in the conventional machining center, but here preferably is constituted by an electroerosion machine, e.g. EDM (electrical discharge machining) machine, as shown in FIG. 2. The machine shown there includes a ram head 31 which carries the tool holder 32 and a work tank 33 accommodating a working a liquid (e.g. liquid dielectric such as deionized water in EDM) and defining the shaping zone 33' therein. The work tank 33 has a workpiece W securely mounted on a workpiece support 34 therein and is securely mounted on a worktable 35 comprising a cross-table movably mounted on a base 36. The cross-table 35 is driven horizontally by means of a pair of motors, X-axis motor 37 and Y-axis motor 38, to displace the workpiece W in an X-Y or horizontal plane. The ram head 31 is provided with a Z-axis motor 39 to displace the tool electrode T in a vertical . direction or the direction of a Z-axis perpendicular to the X-Y plane. An electroerosion generator or power supply (EPS) 30 is electrically connected to the tool electrode T and the workpiece W to pass an electric current therebetween across a machining gap to erosively remove stock from the workpiece W. The motors 37, 38 and 39 and the power supply 38 are controlled in known manner by command signals 3a, 3b, 3c, 3d furnished by the NC unit 4 to carry out a given shaping operation for the workpiece W.

As is customary in electroerosion machines, the erosion generator 30 is designed to pulse or quantumize the machining electrical energy. Thus, the machining energy can be distributively supplied in a finely regulated fashion under control commands of the NC unit 4 such that given a tool electrode T, a high-precision erosive stock removal can be accurately predicted. Also, as is customary in numerically controlled machine tools, the drive motors 37, 38 and 39 are driven to establish a unit of relative displacement between the tool T and the workpiece W in each direction which is as fine as 1 micrometer or less. While the NC system is thus inherently capable of both positioning and stock-removing with an extremely high precision, it is recognized that these capabilities have not hitherto been fully exploited. Problems arise as to the accuracy of a formed machine tool introduced as a three-dimensional body into the machining center which has its own coordinate system on which the numerical control is based. It should be pointed out that an NC positioning system with its own positioning precision is only capable of positioning with that precision a tool center or reference point and itself never assures that each point of the active surface of the tool is so positioned, thus the accuracy of the tool itself when introduced into the machining center and hence onto the machine tool therein. These problems are effectively solved by providing the tool reforming stage 6 in the present invention.

Referring to FIG. 2, the tool storage station 1 is shown provided with a magazine 11 for accepting a plurality of machining tools, T1, T2, T3, . . . which are different in shape as suitable to perform successive shaping operations for a single workpiece W or successive workpiece W in the machine tool 3. In the present invention, by virtue of the provision of the tool reforming station to be described, the number of these tools can be largely reduced. For example, a single given tool T may be used for a plurality of shaping operations of different machining grades, e.g. roughing, finishing and fine-finishing of a given workpiece W or a given portion thereof. Furthermore, each of the tools T need not necessarily have been preformed with the high precision mentioned previously when supplied into the system and may even be a scrap tool. Each tool T may be recycled between the machine tool 3 and the tool storage station 1 and repeatedly reformed until it is no longer useful for intended shaping purposes. A plurality of tools T1, T2, T3, . . . which are like and simpler in shape may also be stored in the magazine 11 and may be reformed by the reforming means 6 into tools which are different in shape, or tools which are similar in shape but slightly different in size, depending on the intended purposes. The magazine 11 is provided with seats 12 in which the tools T1, T2, T3, . . . supplied or returned are respectively retained. The tool supporting magazine 11 is carried rotatably on a post 13 and rotated by a motor 14 retained in a base 15. The motor 14 is driven by control commands 4a of the NC unit 4 to sequentially bring the tools T1, T2, T3 into position for removal by a grabbing member 21 of the tool changing mechanism 2.

The tool changing mechanism 2 is thus also of conventional design and may have an actuator 22 operative by control commands 2a from the NC unit 4 to actuate the grabbing member 21 to remove a selected tool T from the tool magazine 11. The grabbing member 21 may be securely carried on a spindle 23 rotatably supported by a base 24. The spindle 23 is rotated by a motor 25 in response to control commands 2b from the NC unit 4 to move the grabbing member 21 to transfer the removed machining tool T from the magazine 11 to the tool holder 32 and to return it from the latter to the former. The machining tool T transferred to the machine tool 3 is secured by the grabbing member 21 to the tool holder 32 again under control commands 2c of the NC unit 4.

The tool reforming means 6 in the illustrated embodiment comprising a tool handling unit 601 which may be in the form of an industrial robot. The tool handling unit or robot 601 comprises a base 602 fixed in position and a carriage 603 rotatable about a vertical axis by means of a motor 604. The carriage 603 has a cylinder 605 pivotally or swivelably mounted thereon, from which an extendable arm 606 projects. The arm 606 carries a grapple hand 607 for gripping a machining tool T and securely mounting it in a work holder in a reforming machine tool to be described. Motors which effectuate a swivel motion of the cylinder 605, an axial motion of the arm 606 and a gripping action of the hand 607 are designated generally at 608. Thus, the tool handling unit 601 may be employed having all practical abilities of the conventional industrial robot. The motor 604 and the motors 608 are driven by control commands 601a of the NC unit 4 to reach a machining tool T on the magazine 11 in the tool storage station 1, on the arm of the tool changing mechanism 2 or the tool holder 32 in the machine tool 3 to remove the tool therefrom and to transfer and secure it to the tool holder in the reforming machine to be described. It will be apparent that the tool handling unit or robot 601 may also replace and serve as the tool changing mechanism 2.

The tool reforming station may comprise one or more subsidiary machine tools and preferably includes an electroerosion machine 610. The machine 610 shown comprises a working vessel 611 in which a work table 612 is disposed as immersed in a machining liquid 617, e.g. kerosene or deionized water in EDM. The work table 612 has a work holder 613 securely mounted thereon to securely support the machining tool T which was delivered by the robot 601. An electroerosion electrode 614 for reforming the machining surface Ta of the tool T is fastened by means of a chuck 615 to a vertical stem 616 which is supported by a vertical carriage 617 so as to be axially movable to displace the electrode 614 in the direction of a Z-axis. The vertical carriage 617 is secured to a displacement table 618 which is in turn secured to brackets 620. The displacement table 618 is displaceable on parallel bars 621 mounted on the top of the working vessel 611, in a horizontal direction, i.e. the direction perpendicular to the sheet of the drawing, to displace the reforming electrode 614 translationally in the direction of an X-axis. This displacement is effected by a motor or motors 622 carried on one or both of the brackets 620 and drivingly coupled with the displacement table 618 via a leadscrew or leadscrews 623. The vertical carriage 617 is also secured to a horizontal, Y-axis carriage 619 which is displaceable on parallel bars 624 secured to the brackets 620. The carriage 619 is carried on a leadscrew 625 drivingly coupled therewith and journaled on the brackets 620. The leadscrew 625 is driven by a motor 626 on one of the brackets 620 to displace the reforming electrode 614 translationally in the Y-axis direction. A motor associated with the Z-axis carriage 617 for moving the reforming electrode 614 axially or in the Z-axis direction is shown at 627. An electroerosion power supply 628 is shown as electrically connected to the reforming electrode 614 and to the machining tool T to effect an erosion of the tool machining surface Ta.

Upon the robot 601 properly loading the machining tool T in the subsidiary electroerosion machine 610 and securely positioning it in the work holder 613 on the work table 612 under the numerical commands 601a of the NC unit 4, the reforming electrode 614 may commence moving from a given position in the three-dimensional coordinate system of the machining center within the working vessel 611. Thus, the motors 622, 626 and 627 are actuated to three-dimensionally move the reforming electrode 614 under numerical commands 610a, 610b and 610c from the NC unit 4 and the power supply 628 is turned on to initiate electroerosion under control commands 610d also from the NC unit 4. The control commands 610d are provided to establish a fine-finishing mode of electroerosion in the power supply 628. Under the numerical commands 610a–610c from the NC unit 4, the reforming electrode 614 is allowed to move adjacent the tool machining surface Ta along a prescribed three-dimensional path which is computed in the NC unit 4 from input data for a desired finish and reforming contour of the machining surface Ta and an erosion gap spacing to be maintained between the reforming electrode 614 and that surface for the finish erosion mode established. The machining tool T is securely positioned and the reforming electrode 614 is moved along such a precisely regulated path, in the prescribed coordinate system of the machining center. It follows therefore that the machining tool T acquires a reformed machining surface which is highly accurate in the coordinate system and three-dimensionally positionable without loss of the accuracy in the principal machine tool 3 into which it is to be subsequently transferred or retransferred. The three-dimensional path computed may be stored in a memory circuit in the NC unit 4 and reproduced to produce corresponding signals which are processed to modify the command signals for the principal machine tool 3 with the tool T in a previous shaping step to produce numerical commands to be applied in a subsequent shaping step with the same tool T with the reformed machining surface.

The reforming station 6 may alternatively and should preferably in addition include a cutting or milling machine 630 and/or a grinding machine 650. Each of these machines may be employed as an alternative of the subsidiary electroerosion machine 610 where appropriate or as an addition thereto to further reform or finish a reformed machining tool T removed from the machine 610 by the robotic hand 607 or to rough-reform a machining tool T removed by the robot 601 from the tool storage station 1, the tool changing mechanism 2 or the principal machine tool 3 and to be removed by the robot 601 into the reforming electroerosion machine 610 for further reforming or finishing. Each of the machines 630 and 650 may be basically of conventional design.

The cutting or milling machine 630 comprises a cutter table or working head 631 which holds a cutting or milling tool 632 and is carried on a cross table 633 horizontally movably mounted on a base 634. The cross table 633 has an X-axis motor 635 and a Y-axis motor 636 drivingly coupled thereto by way of their respective leadscrews (not shown). Thus, the cutting tool 632 is displaceable in a horizontal or X-Y plane. The machine 630 also includes a workpiece carriage 637 which may be securely mounted on the base 634. The carriage 637 has a rotary spindle 638 having a work holder 639 secured thereto to which the machining tool T having a machining surface Ta to be reformed is fastened by means of a chuck 640. The spindle 638 is rotatable to rotate the tool machining surface Ta about the tool axis by means of a motor 641. The carriage 637 is vertically movable by a motor 642 to displace the machining tool T in the direction of a Z-axis. The motors 635, 636 and 642 are driven by numerical commands from the NC unit 4 to relatively displace the rotating machining tool T and the cutting or milling tool 632 along a three-dimensional path which is programmed in the NC unit 4 following input data to generate a desired reformed machining surface in the tool surface Ta. The motor 641 for rotating the spindle 638 may also be controlledly driven in response to control signals 630d generated in the NC unit 4 to compensate for the cutting load encountered by the cutting or milling tool 632 during the reforming operation.

The grinding machine 650 makes use of an abrasive wheel 651 secured to a rotary shaft 652 projecting with a variable length from a cylinder 653. The cylinder 653 is swivelably mounted on parallel stands 654 which is mounted on a cross-table 655 which is in turn mounted horizontally movably on a base 656. The cross-table 655 is movable in the direction of an X-axis by a motor 657 and in the direction of a Y-axis by a motor 658. The cross-table 655 also carries a motor 659 which has a worm gear 660 coupled with its output shaft and in mesh with a toothed sector wheel 661 secured to the cylinder 653 by a shaft 662, the latter forming the pivot for the swiveling cylinder 653. The machine 650 also includes a workpiece carriage 663 having a work holder 664 which has a machining tool T to be reformed fastened thereto by a chuck 665. The carriage 663 is vertically movable by a motor 666 to move the machining tool T up and down or in the direction of a Z-axis. Here again, the motors 657, 658 and 664 are driven under the numerical commands 650a, 650b and 650c from the NC unit 4 to relatively move the reformable machining tool T and the rotating abrasive wheel 652 along a three-dimensional path which is programmed in the NC unit 4 following corresponding input data to generate a predetermined reforming surface in the machining surface Ta of the tool T. It will be understood that the carriage assembly 663–665 may be dispensed with and the robot 601 may serve therefor so that the tool T as it is gripped by and retained on the robotic hand 607 can undergo the reforming operation.

What is claimed is:

1. A machining system for shaping workpieces, comprising:

a numerical control unit for transmitting numerical commands in accordance with input data received therein;

a principal EDM machine tool having holding means for securely supporting a member in machining relationship with a workpiece in a shaping zone and machining feed means operable under a first set of numerical commands of the NC unit to shape the workpiece into commanded shape and dimensions in said zone by means of the machining member;

a tool storage station for accepting a plurality of formed EDM machining tools and including machining tools which differ from one another in shape or size to serve different functions, in a magazine thereof to retentively hold them on their respective retainer means therein;

tool transfer means operatively associated between said tool storage station and said machine tool and having transfer drive means operable under a second set of numerical commands of the control unit to accept a selected one of said formed machining tools from said magazine and to transfer and secure it to said tool holding means for shaping said workpiece with it as said machining member in said machine tool and thereafter for returning it to said magazine; and tool reforming means operable to actuate under a third set of numerical commands of the control unit to act on a said selected formed machining tool when on one of said retainer means, said transfer means and said tool holding means, said tool reforming means including at least one subsidiary machine tool operable under a fourth set of numerical commands of the control unit to reform said formed machining tool by commanded dimensions for transfer or re-transfer into said shaping zone in the principal machine tool.

2. The system defined in claim 1 wherein said at least one subsidiary machine tool includes a subsidiary electroerosion machine.

3. The system defined in claim 2 wherein said at least one subsidiary machine tool further includes a milling machine and a grinding machine.

4. A machining system for shaping a workpiece, comprising:

a digital control circuit;

a principal EDM machine tool having tool holding means for securely supporting a member in machining relationship with the workpiece in a shaping zone and machining feed means operable under a first set of digital commands from the control circuit to shape the workpiece into commanded shape and dimensions by means of the machining member;

a tool reception stage for accepting in retainer means therein a plurality of EDM machining tools preformed outside of the system and including machining tools which differ from one another in shape or size to serve different functions;

tool transfer means arranged to interconnect said tool reception stage and said machine tool and operable under a second set of digital commands from the control circuit to transfer the accepted preformed machining tool from the tool reception stage to the tool holding means for shaping the workpiece with it as said machining member in said machine tool; and a tool reforming stage operable to actuate under a third set of digital commands from the control circuit to act on the machining tool when on one of said retainer means, said transfer means and said holding means, the tool reforming stage including at least one subsidiary machine tool operable under a fourth set of digital commands from the control circuit to reform the preformed machining tool by commanded dimensions for transfer or re-transfer into said shaping zone in said principal machine tool.

5. The system defined in claim 4 wherein said at least one subsidiary machine tool includes a subsidiary electroerosion machine.

6. The system defined in claim 4 wherein said at least one subsidiary machine tool includes a milling machine and a grinding machine.

7. A machining system for shaping a workpiece, comprising:

a numerical control unit for transmitting control commands following input data received therein;

a principal EDM machine tool having tool holding means for accepting a selected one of plurality of formed EDM machining tools and securely supporting it in machining relationship with the workpiece in a shaping zone and machining feed means operable under a first set of control commands from the NC unit to partially shape the workpiece into commanded shape and dimensions by means of the formed machining tool, said machining tools including machining tools which differ from one another in shape or size to serve different functions; and tool reforming means comprising tool handling means operative under a second set of control commands from the NC unit to remove the machining tool out of the shaping zone of the machine tool and at least one subsidiary machine tool operative under a third set of control commands from the NC unit to reform the removed machining tool by commanded dimensions, the tool handling means being operative under a fourth set of control commands from the NC unit to return the reformed machining tool into the shaping zone in the principal machine tool, the machining feed means therein being then operative under a fifth set of control commands from the NC unit to continue shaping of the partially shaped workpiece to shape it into commanded shape and dimensions.

8. The system defined in claim 7 wherein said at least one subsidiary machine tool includes a subsidiary electroerosion machine.

9. The system defined in claim 7 wherein said at least one subsidiary machine tool includes a milling machine.

10. The system defined in claim 7 wherein said at least one subsidiary machine includes a grinding machine.

* * * * *